United States Patent
Dickenson et al.

(10) Patent No.: US 7,849,567 B2
(45) Date of Patent: *Dec. 14, 2010

(54) SPRING FASTENER WITH HIGHLY IMPROVED REMOVAL TO INSERTION RATIO

(75) Inventors: Daniel James Dickenson, Arlington Heights, IL (US); Michael Walter Smith, Lake Zurich, IL (US); Lawrence John Conway, Des Plaines, IL (US); Paul Lester Clements, Lake Zurich, IL (US)

(73) Assignee: Termax Corporation, Lake Zurich, IL (US)

( * ) Notice: Subject to any disclaimer, the term of this patent is extended or adjusted under 35 U.S.C. 154(b) by 264 days.

This patent is subject to a terminal disclaimer.

(21) Appl. No.: 11/468,960

(22) Filed: Aug. 31, 2006

(65) Prior Publication Data

US 2008/0174151 A1 Jul. 24, 2008

Related U.S. Application Data

(60) Continuation of application No. 10/692,828, filed on Oct. 24, 2003, now abandoned, which is a continuation-in-part of application No. 10/164,963, filed on Jun. 7, 2002, now Pat. No. 6,718,599, application No. 11/468,960, which is a division of application No. 10/704,094, filed on Nov. 7, 2003, now abandoned, and a continuation of application No. 11/138,604, filed on May 26, 2005, now Pat. No. 7,640,634, and a continuation of application No. 11/179,970, filed on Jul. 12, 2005, now Pat. No. 7,428,770.

(60) Provisional application No. 60/301,364, filed on Jun. 25, 2001, provisional application No. 60/327,814, filed on Oct. 9, 2001, provisional application No. 60/353,515, filed on Feb. 1, 2002.

(51) Int. Cl.
F16B 5/06 (2006.01)
F16B 2/24 (2006.01)
F16B 5/12 (2006.01)

(52) U.S. Cl. .............................. 24/293; 24/294; 24/295

(58) Field of Classification Search ................... 24/289, 24/293–295, 297, 458, 517, 662; 52/718.01; 296/201; 411/508–510, 913
See application file for complete search history.

(56) References Cited

U.S. PATENT DOCUMENTS

| | | | | |
|---|---|---|---|---|
| 1,965,520 | A * | 7/1934 | George | 24/581.11 |
| 2,100,017 | A * | 11/1937 | Van Uum | 24/294 |
| 2,178,719 | A * | 11/1939 | Cotter | 24/293 |
| 2,188,026 | A * | 1/1940 | Wiley | 24/293 |

(Continued)

FOREIGN PATENT DOCUMENTS

CA 4967000 10/1953

(Continued)

*Primary Examiner*—Robert J Sandy (57) ABSTRACT

A fastener comprises two engagement springs on opposite sides of the fastener. Each engagement spring has an elongated rib. The elongated ribs may have a substantially rectangular shape, or any suitable shape, and they may protrude away from the opposite side of the fastener. Additionally, the elongated ribs may have same or different slopes at each end of the ribs. According to one embodiment, the elongated rib increases the removal to insertion force ratio as compared to such ratio when the engagement springs do not have the elongated rib.

26 Claims, 9 Drawing Sheets

U.S. PATENT DOCUMENTS

| | | | | |
|---|---|---|---|---|
| 2,192,359 | A * | 3/1940 | Lombard | 24/295 |
| 2,217,781 | A * | 10/1940 | Wiley | 52/716.7 |
| 2,655,072 | A * | 10/1953 | Poupitch | 411/548 |
| 2,655,239 | A * | 10/1953 | Kenlock | 52/204.597 |
| 2,851,757 | A * | 9/1958 | Pender | 24/294 |
| 3,864,789 | A * | 2/1975 | Leitner | 24/293 |
| 4,043,579 | A * | 8/1977 | Meyer | 293/143 |
| 5,092,550 | A | 3/1992 | Bettini | |
| 5,095,592 | A | 3/1992 | Doerfling | |
| 5,129,768 | A | 7/1992 | Hoyle et al. | |
| 5,367,751 | A | 11/1994 | DeWitt | |
| 5,373,611 | A | 12/1994 | Murata | |
| 5,422,789 | A | 6/1995 | Fisher et al. | |
| 5,542,158 | A | 8/1996 | Gronau et al. | |
| 5,887,319 | A | 3/1999 | Smith | |
| 5,919,019 | A | 7/1999 | Fischer | |
| 5,987,714 | A | 11/1999 | Smith | |
| 6,141,837 | A | 11/2000 | Wisniewski | |
| 6,203,240 | B1 | 3/2001 | Hironaka | |
| 6,279,207 | B1 * | 8/2001 | Vassiliou | 24/293 |
| 6,341,466 | B1 | 1/2002 | Kehoe et al. | |
| 6,381,811 | B2 | 5/2002 | Smith et al. | |
| 6,691,380 | B2 | 2/2004 | Vassiliou | |
| 6,868,588 | B2 | 3/2005 | Dickinson | |
| 2004/0083582 | A1 | 5/2004 | Dickinson | |
| 2005/0217082 | A1 | 10/2005 | Vassiliou | |
| 2005/0246870 | A1 | 11/2005 | Dickenson | |

FOREIGN PATENT DOCUMENTS

| | | |
|---|---|---|
| DE | 2255094 | 5/1973 |

* cited by examiner

SPRING FASTENER WITH HIGHLY IMPROVED REMOVAL TO INSERTION RATIO

RELATED APPLICATIONS

This application is a continuation of non-provisional application Ser. No. 10/692,828, filed on Oct. 24, 2003 now abandoned, which is a continuation in part of non-provisional application Ser. No. 10/164,963, filed Jun. 7, 2002, now U.S. Pat. No. 6,718,599, Divisional application Ser. No. 10/704,094, filed Nov. 7, 2003 now abandoned, continuation patent application Ser. No. 11/138,604 filed on May 26, 2005 now U.S. Pat. No. 7,640,634, and continuation patent application Ser. No. 11/179,970 filed on Jul. 12, 2005 now U.S. Pat. No. 7,428,770, all of which are based on priority of provisional patent applications 60/301,364, filed Jun. 25, 2001, 60/327,814, filed Oct. 9, 2001, and 60/353,515, filed Feb. 1, 2002. All of the above are incorporated herein by reference in their entirety.

FIELD OF THE INVENTION

This invention relates to spring fasteners, and more particularly to those fasteners which are suitable to be engaged reversibly in a slot (can be inserted into the slot and extracted from the slot) of a solid sheet and support a panel through an extension of the panel.

BACKGROUND OF THE INVENTION

A number of fasteners have been used in the past for securing one object on another object, as for example, securing an article such as for example a plastic sheet on a metal or other rigid plastic sheet. However, the fasteners of the type, which are improved by the advances of the present invention, and being used presently, have a rather low ratio of insertion force to removal force. In other words, they require considerable force to be inserted into a slot in order to provide adequate removal resistance in order to be removed from the slot.

Examples of conventional fasteners are disclosed in U.S. Pat. No. 5,987,714 (Smith); U.S. Pat. No. 5,887,319 (Smith); U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi); U.S. Pat. No. 5,095,592 (Doerfling); U.S. Pat. No. 4,792,475 (Bien); U.S. Pat. No. 4,683,622 (Ohelke); U.S. Pat. No. 4,609,170 (Schnabl); U.S. Pat. No. 4,245,652 (Kelly et al.); U.S. Pat. No. 3,864,789 (Leitner); U.S. Pat. No. 3,673,643 (Kindell); U.S. Pat. No. 3,525,129 (Holton); U.S. Pat. No. 2,825,948 (Parkin); U.S. Pat. No. 2,607,971 (Bedford, Jr.); U.S. Pat. No. 2,542,883 (Tinnerman); U.S. Pat. No. 2,329,688 (Bedford, Jr.); U.S. Pat. No. 2,322,656 (Murphy), among others.

U.S. Pat. No. 5,919,019 (Fisher) provides fasteners which can only be permanently installed into a slot; they can only be inserted but not extracted. The major engagement is performed by spring strips, while frictional portions of the fastener pass through the slot with at most slight compression, and immediately after the insertion of the fastener they are located in slightly spaced or barely contacting relation with the edges of the slot. They are only activated for engagement after the insertion of a bolt into a hole at the base plate. Thus, the profound effect of the increased removal to insertion ratio (explained in detail hereinbelow) is not recognized, mentioned, or implied. Further, the intentionally provided distance of the frictional portions away from the edges of the slot by Fisher, during insertion and before, use the bolt.

SUMMARY OF THE INVENTION

According to one embodiment, a fastener comprises a first side, a second side opposite the first side, a first engagement spring and a second engagement spring. The first side is connected to the second side thereby forming a U-shaped structure having a cavity between the first side and the second side. The fastener further comprises a bottom portion where the first side and the second side are connected. The first engagement spring is connected to the first side in the vicinity of the bottom portion. The second engagement spring is connected to the second side in the vicinity of the bottom portion. The first engagement spring comprises a first elongated rib. The second engagement spring comprises a second elongated rib.

According to one embodiment, at least one of the engagement springs comprises an engagement region with a hindrance portion. The hindrance portion may be at least a partially elongated rib, an upward solid bent extension, a ripple, a knurled region, and any combination thereof According to another embodiment, the spring fastener comprises a first side and a second side opposite the first side, the first side connected to the second side thereby forming a U-shaped structure having a bottom portion and a top portion, the first side comprising a first engagement spring connected to the first side in the vicinity of the bottom portion, the second side comprising a second engagement spring connected the second side in the vicinity of the bottom portion, each of the first and second engagement springs having a free end in the vicinity of the top portion, each spring also comprising a peak, and an engagement region with a hindrance portion between the free end and the peak, the hindrance portion providing increased removal to insertion force ratio, and wherein the fastener can be extracted from any slot into which slot the fastener can be inserted.

According to another embodiment, a vehicle comprising two parts connected with a spring fastener, the one part having an extension fitting into a cavity of the fastener, and the other part having a rectangular or square slot suitable to accept the fastener, the spring fastener comprising a first side and a second side opposite the first side, the first side connected to the second side thereby forming a U-shaped structure having a bottom portion and a top portion, the first side comprising a first engagement spring connected the first side in the vicinity of the bottom portion, the second side comprising a second engagement spring connected the second side in the vicinity of the bottom portion, each of the first and second engagement springs having a free end in the vicinity of the top portion, each spring also comprising a peak, and an engagement region with a hindrance portion between the free end and the peak, the hindrance portion providing increased removal to insertion force ratio, and wherein the fastener can be extracted from any slot into which slot the fastener can be inserted.

According to another embodiment, an assembly comprises a panel, such as a body panel, an interior body panel or any suitable panel, and the fastener operatively coupled to the panel.

According to another embodiment, a vehicle comprises a vehicle chassis, such as an automobile frame, an interior pillar, or any suitable frame, and the fastener operatively coupled to the vehicle chassis.

DESCRIPTION OF THE DRAWINGS

The reader's understanding of practical implementation of preferred embodiments of the invention will be enhanced by reference to the following detailed description taken in conjunction with perusal of the drawing figures, wherein:

FIG. 16 illustrated a fragmental view of another embodiment, which relates a preferable distance between the front point of a barb and the first side, with the thickness of the material that the fastener is made from.

DETAILED DESCRIPTION OF THE INVENTION

According to one embodiment, a spring fastener includes a structure suitable to be engaged in a slot and secure one article on another article.

Figure 1:
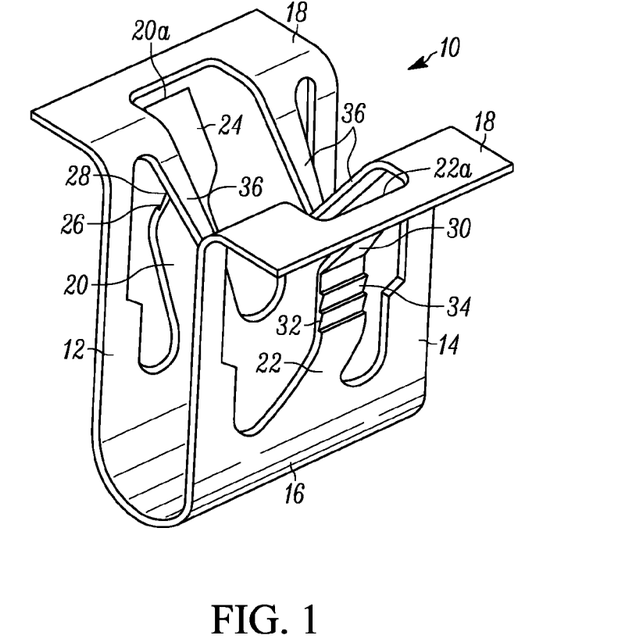
FIG. 1 illustrates a perspective view of a sealing spring fastener according to an embodiment of the present invention, wherein the hindrance portion comprises crating or ripples.
Figure 2:
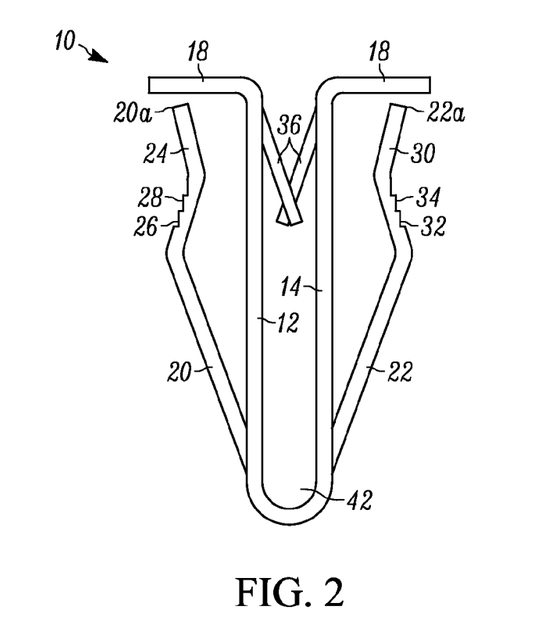
FIG. 2 shows a side view of the fastener of FIG. 1

More specifically, as better shown in FIGS. 1 and 2, a spring fastener 10, comprises a first side 12 and a second side 14 opposite the first side 12. The first side 12 is connected to the second side 14, thereby forming the fastener 10 having a U-shaped structure.

The U-shaped structure has a bottom portion 16, where the two portions 12 and 14 join, and a top portion 18. The first side 12 comprises a first engagement spring 20 connected to the first side 12 in the vicinity of the bottom portion 16. The second side comprises a second engagement spring 22 connected the second side 14, also in the vicinity of the bottom portion 16.

Each one of the first and second engagement springs, 20 and 22, has a free end 20a and 22a, respectively, in the vicinity of the top portion 18. The first engagement spring 20 may comprise the first end 20a, a first recess 24, a first peak 26, and a first engagement region 28 shown, according to this embodiment, between the optional first recess 24 and the first peak 26. According to one embodiment, the first engagement region includes a hindrance portion 29 in this case comprising crating or ripples. Similarly, the second engagement spring 22 may comprise a second free end 22a, an optional second recess 30, a second peak 32, and a second engagement region 34 shown, according to this embodiment, between the second recess 30 and the second peak 32. According to one embodiment, the second engagement region 34 includes a hindrance portion 29 in this case comprising a crating or ripples. The presence of the recesses 24 and 30 is preferable, but not necessary. In the absence of recesses 24 and 30, the free ends 20a and 22a assume the location of said recesses 24 and 30. Crating or ripples are structures comprising one or more linear impressions or scores preferably substantially parallel to each other, as for example shown in FIGS. 8 and 9, wherein only one crating or ripple (in the form of impression or score) is present.

The hindrance portion 29 may be along the whole engagement regions 28 and 34, respectively, or along part of them, preferably closer the peaks 26 and 32.

According to one embodiment, the hindrance portions 29 provides increased removal to insertion force ratio, and at the same time allow the fastener to be extracted from any slot into which slot the fastener can be inserted.

Figure 3:
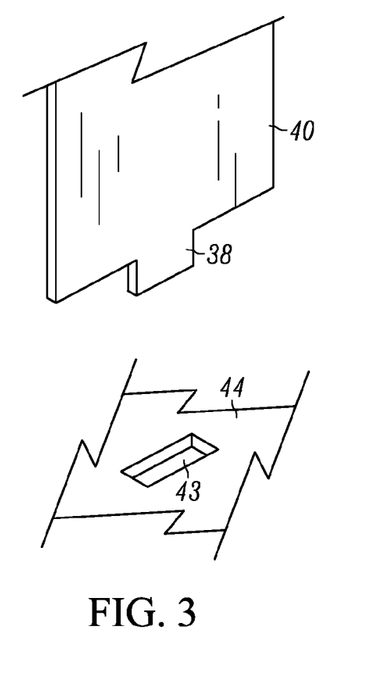
FIG. 3 illustrates two panels, which can be connected with the fastener of FIGS. 1 and 2.

The fastener 10 may also be provided with barbs 36, the function of which is to secure the extension 38 of a panel 40 (FIG. 3) into the cavity 42 (FIG. 2) of the fastener 10. The barbs 36 may be preferably designed in a manner to promote easy insertion of the extension 38 into the cavity 42, but more difficult extraction. Such barbs 36 are elongate curved barbs close to their front points pointing inwardly, as better illustrated in FIGS. 14A, 15A, and 17, and also disclosed in U.S. Pat. Nos. 6,279,207 B1 and 6,691,380 B2, both of which are incorporated herein by reference.

The length of the regions of the first and/or the second engagement springs 20 and 22, respectively, between the respective optional recesses and free ends, can vary from zero to such a length that will not interfere with the top end 18 of the fastener in operation. In such an occasion the recesses become free ends. However, most preferably, these regions have a definite length higher than zero.

In operation of this embodiment, the fastener 10 is operatively inserted into a slot 43 of a panel 44, before or after the extension 38 of panel 40 has been inserted into the cavity 42 of the fastener 10.

Figure 4:
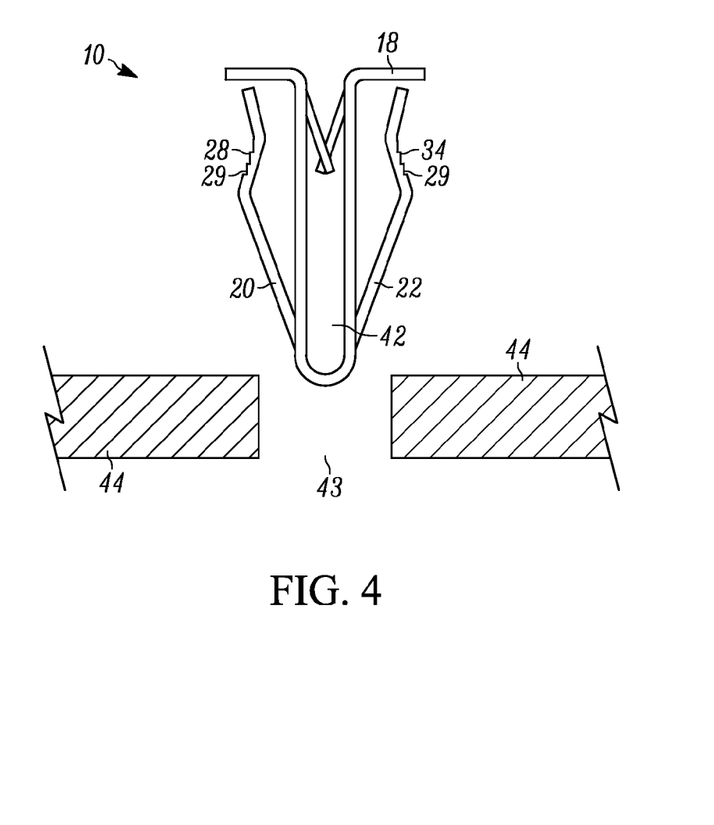
FIG. 4 illustrates the side view of the fastener of FIG. 1 and a cross section of a panel, in a slot of which panel the fastener may be inserted.
Figure 5:
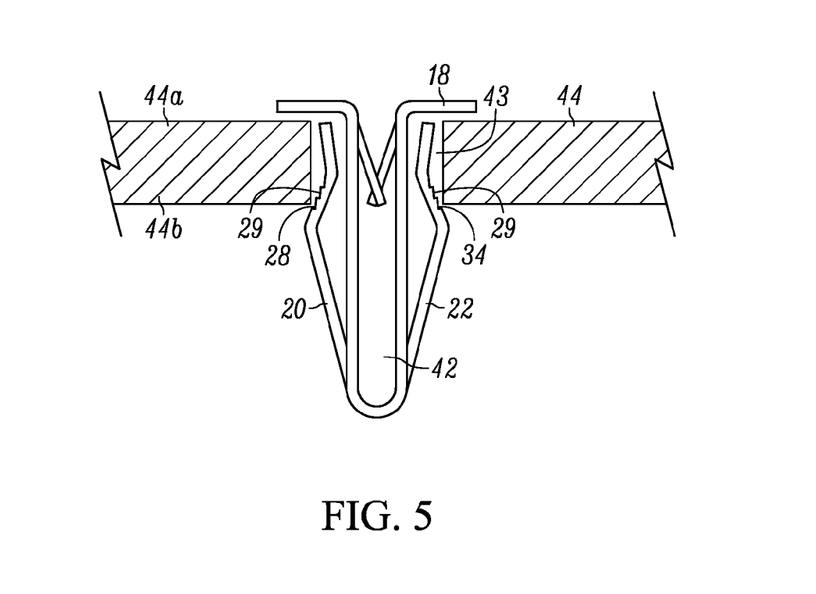
FIG. 5 illustrates the same elements shown in FIG. 4 after insertion of the fastener into the slot of the panel.

As better illustrated in FIG. 4, the fastener 10 with the engagement springs 20 and 22 in an expanded form is over the slot 43 of the panel 44. In FIG. 5, the fastener is shown after it has been inserted into the slot 43 of the panel 44. At this position, the fastener is secured at the top portion 18 by the upper side 44a of the panel 44, and at the engagement portions 28 and 34 by the lower side 44b, at the point where the lower side 44b intersects with the slot 43. In this position of the fastener 10, the engagement springs 20 and 22 are compressed toward each other as shown in FIG. 5. In this particular case, illustrated in FIGS. 4 and 5, the hindrance portion covers the whole engagement region.

Figure 7:
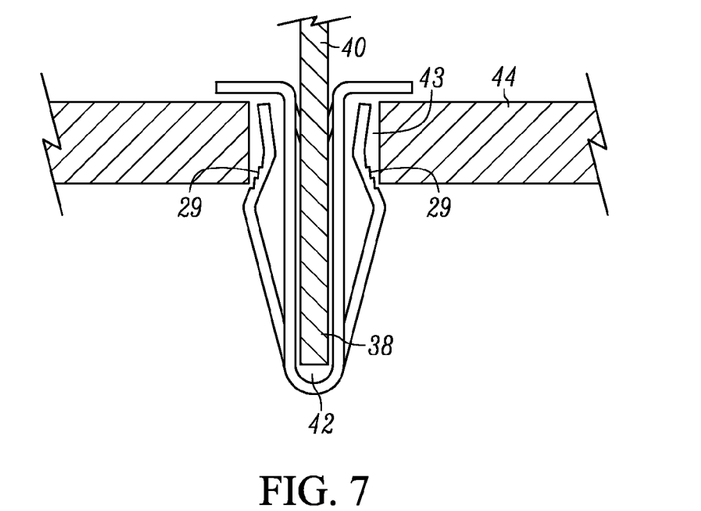
FIG. 7 illustrates the same elements shown in FIG. 6 after insertion of the fastener into the slot of the panel containing the slot.

In sequence, the extension 38 of the panel 40 is inserted into the cavity 42 of the panel 40, thereby connecting panel 40 with panel 44 through the spring fastener 10, which has already been inserted into the slot 43 of panel 44, as better shown in FIG. 7.

Figure 6:
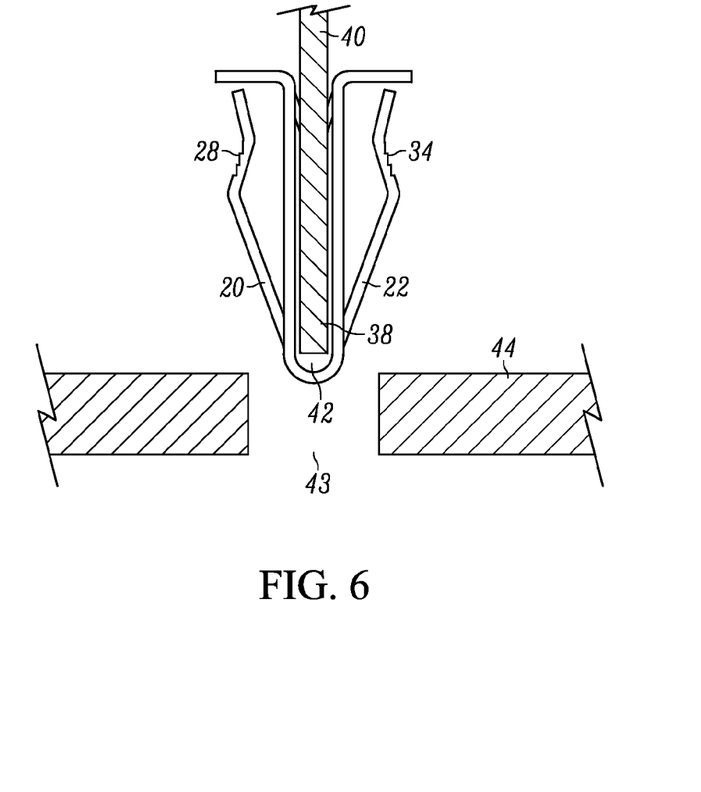
FIG. 6 illustrates the same elements shown in FIG. 4 after insertion of another panel into the cavity of the fastener.

In addition, the extension 38 may be first inserted into the cavity 42 of the fastener 10, as better shown in FIG. 6, and then this assembly secured into the slot 43 of panel 44, as also shown in FIG. 7.

For example, the force required to insert the fastener 10 into the slot 44 is slightly higher, if at all higher, than the force that would be required to insert the fastener 10 into the slot 44 if the engagement portions were lacking the hindrance portion 29.

In contrast, the force to remove the fastener 10 from the slot 44 is considerably higher than the force that would be required to remove the fastener 10 from the slot 44 if the engagement portions were smooth (in the absence of hindrance portion 29).

This unexpected finding of major increase of the removal to insertion force ratio (force required to remove the fastener divided by the force required to insert the fastener) by use of hindrance portion 29, allows fasteners of this type requiring minimal insertion force but considerable removal force, which is a great advance in the art. A person of ordinary skill in the art would certainly expect to find equal increase in insertion and removal of the fattener by the use of hindrance portion 29, which would give no benefit at all to the ratio.

As aforementioned, U.S. Pat. No. 5,919,019 (Fisher) provides fasteners which can only be permanently installed into a slot; they can only be inserted but not extracted without destruction of the fastener. The major engagement is performed by locking strips (see column 2, lines 38-43), while frictional portions of the fastener pass through the slot with at most slight compression, and immediately after the insertion of the fastener they are located in slightly spaced or barely contacting relation with the edges of the slot (see column 3, lines 29-40). They are only activated for engagement after the insertion of a bolt into a hole at the base plate (see column 3, lines 41-48). Thus, the effect of the increased removal to insertion ratio, as explained hereinabove is not recognized, mentioned, or implied. Further, the intentionally provided distance of the frictional portions away from the edges of the slot by Fisher, during insertion and before, use the bolt. According to one embodiment, the fastener 10 recognizes and takes full advantage of the increased removal to insertion ratio by an engagement portion having hindrance portion 29.

According to one embodiment, if the grated engagement surfaces of the instant invention were located in slightly spaced or barely contacting relation with the edges of the slot, no engagement may take place upon insertion of the fastener of this invention into the slot.

Figure 8:
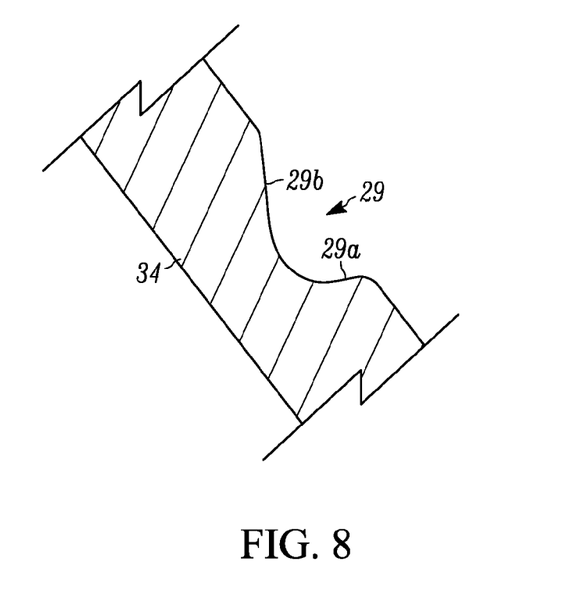
FIG. 8 illustrates an engaging portion having a crating according to another embodiment of the present invention.
Figure 9:
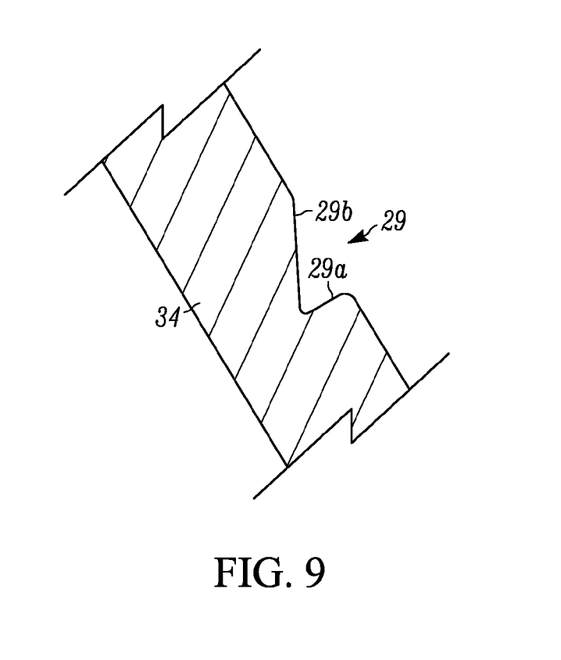
FIG. 9 illustrates an engaging portion having a crating according to still another embodiment of the present invention.

In order to further increase the removal to insertion ratio, the hindrance portion 29 may be preferentially oriented as a ripple to favor easier movement in the way of insertion than in the way of removal of the fastener as better shown in FIGS. 8 and 9. According to one embodiment, the back side 29a of the hindrance portion 29 (FIG. 8) has a gradual curvature, and that the front side 29b extends as much as possible, preferably along the whole length of the engagement portion 34 (shown as a partial extension with a gradual inclination in FIG. 8)

Figure 10:
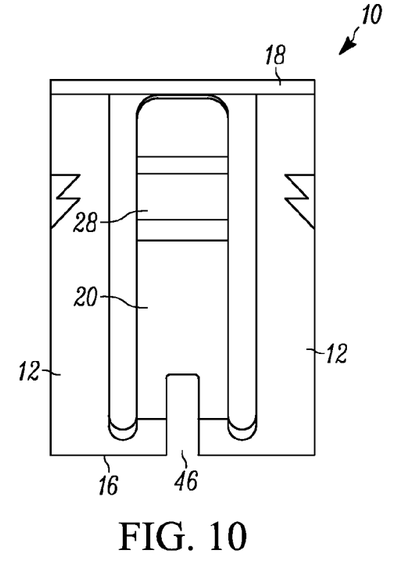
FIG. 10 illustrates a front view of a fastener according to another embodiment of the instant invention, which fastener comprises a relief notch, which provides easier insertion of the spring fastener into a slot.
Figure 10A:
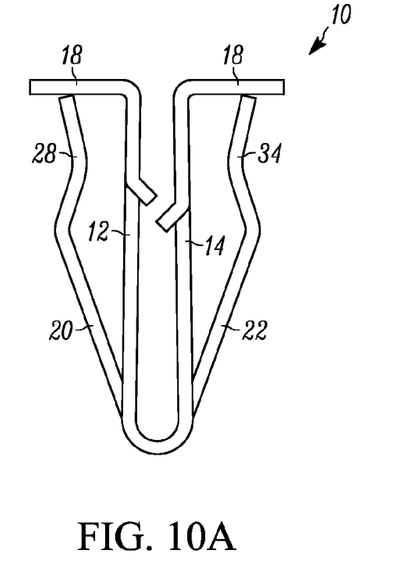
FIG. 10A illustrates a side view of the fastener of FIG. 10.

In another embodiment of the instant invention, better shown in FIGS. 10 and 10A, there is a relief notch 46 at the bottom portion 16 of the fastener 10, which notch 46 facilitates the springiness of the engagement springs 20 and 22, resulting in easier insertion of the fastener into a respective slot 43 (see FIGS. 3-7), thereby increasing the removal to insertion ratio, which always refers to the removal force of the fastener 10 from the slot 43 as compared to the insertion force of the fastener 10 to the slot 43.

The operation of this embodiment is substantially the same as the operation of the previous embodiments, with the difference that the insertion force is caused by the relief notch 46 to be lower than in the absence of such element.

Figure 11:
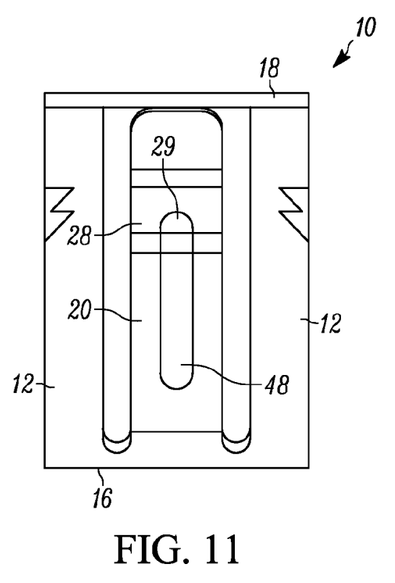
FIG. 11 illustrates a front view of a fastener according to still another embodiment of the instant invention, which fastener comprises a rib, such as an elongated rib.
Figure 11A:
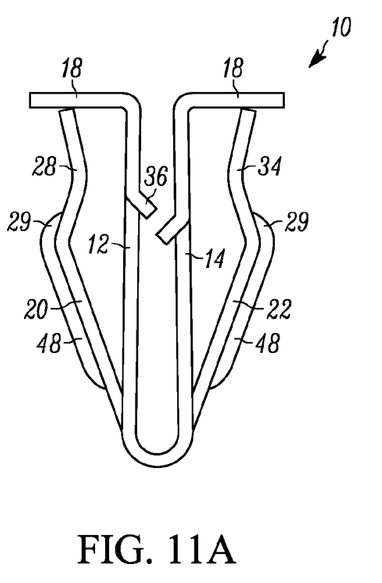
FIG. 11A illustrates a side view of the fastener of FIG. 11.
Figure 11B:
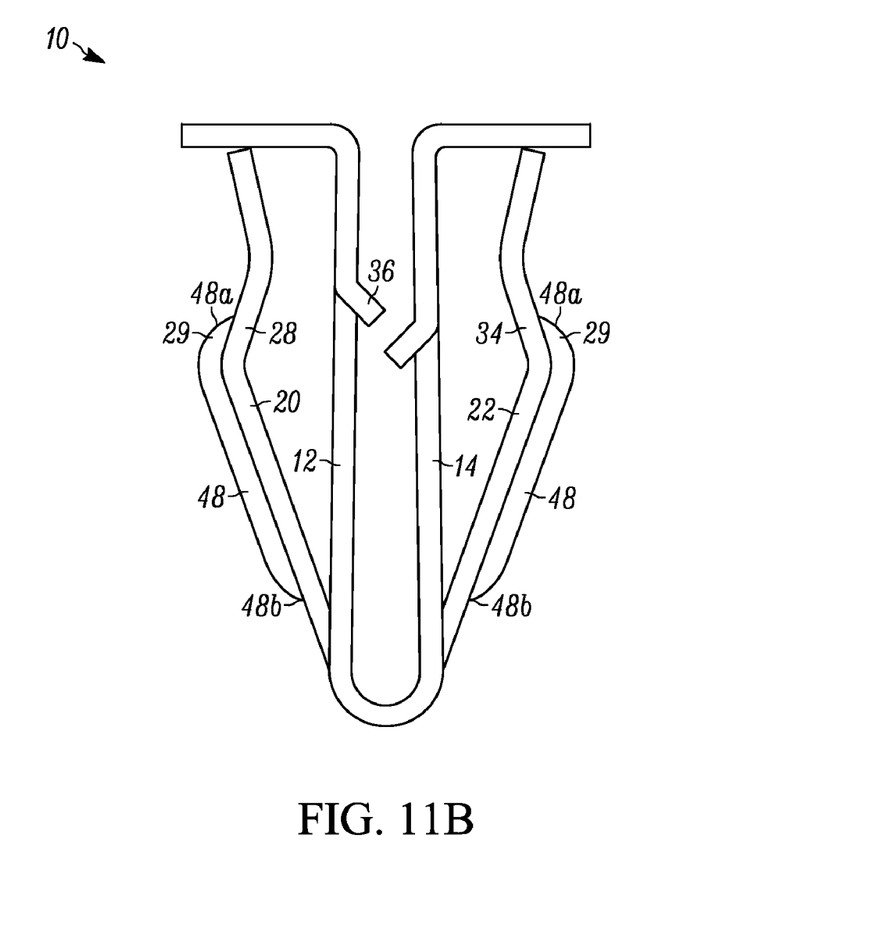
FIG. 11B illustrates the same side view as FIG. 11A, but in a magnified and more detailed fashion.

In another embodiment of the instant invention, shown in FIGS. 11, 11A, and 11B, the first engagement spring 20 comprises a first elongated rib 48 and the second engagement spring 22 comprises a second elongated rib 48'. As shown in FIG. 11, the first elongated rib 48 and the second elongated rib 48' have a substantially rectangular shape either with or without rounded edges. As is also shown in FIG. 11, the substantially rectangular elongated rib 48, 48' is oriented within the rectangular first engagement spring 20 and the second engagement spring 22. Although the elongated rib 48, 48' is shown in FIG. 11 as substantially centered with respect to the engagement springs 20, 22, the elongated rib 48, 48' may be located near the top or bottom, or any location suitable to facilitate engagement as described herein. Although the elongated rib 48, 48' is shown in FIG. 11 as substantially rectangular, it is also contemplated that the first elongated rib 48 and the second elongated rib 48' may have a substantially trapezoidal, square, triangular, diamond, oval shape, hour glass and/or any suitable shape or any suitable combination suitable to facilitate engagement as described herein. A substantial shape of the first elongated rib 48 and the second elongated rib 48' also includes rounded, curved or sharp edges, a suitable deformation or variation of the shape, slope or any suitable combination of shapes, textures, profiles and elevations. As shown in FIGS. 11A and 11B, the first elongated rib 48 and/or the second elongated rib 48' protrude outwardly, for example, away from the opposing engagement spring or side. Thus, the elongated ribs 48, 48' may be formed by stamping or suitably pressing an inside portion engagement springs 20, 22 outwardly, away from the opposing engagement spring or side. According to one embodiment, the elongated ribs 48 act as a hindrance portion 29 or the engagement portion 28 and/or 34. The hindrance portion 29, which according to one embodiment includes the elongated ribs 48, 48' over the engagement portion 28 and/or 34, increases the removal force of the fastener 10 from the respective slot 43 (see FIGS. 3-7).

FIG. 11B is a magnified version of FIG. 11A, which illustrates in more detail the configuration of this embodiment. According to one embodiment, the first engagement spring 20 comprises a first elongated rib 48 and the second engagement spring 22 comprises a second elongated rib 48'. According to one embodiment, the elongated rib 48 is at least partially elongated. According to this embodiment the elongated rib 48 extends at least partially further away from and outside the engagement portions 29 and 34 on the springs 20 and 22, respectively. According to another embodiment, the hindrance portions 29 are positioned over the engagement portions 28 and 34 in the form of the elongated ribs 48, 48'. At least one of: the first elongated rib 48 and/or the second elongated rib 48' protrude or otherwise suitably extend outwardly, for example, away from the opposing engagement spring or side. The elongated ribs 48, 48' may be formed by stamping or suitably pressing an inside portion engagement springs 20, 22 outwardly, away from the opposing engagement spring or side. The elongated ribs 48, 48' may be formed by casting, attaching via a suitable fastening mechanism, cutting engagement springs 20, 22 or manufactured using any other suitable processes or technique.

As further shown in FIG. 11B, the at least one partially elongated rib 48, 48' comprises an upper end 48a and a lower end 48b, the upper end 48a having a slope with respect to the plane of the surface of the spring 20 and/or 22 under it that is different from a slope of the lower end with respect to the plane of the surface of the spring 20 and/or 22 under it.

According to one embodiment, and as well illustrated in FIGS. 11A and 11B, the slope of the lower end 48b is different than the slope of the upper end 48a as illustrated in FIG. 11B. For example, the slope of the lower end 48b may be less than the slope of the upper end 48a. Alternatively, the slope of the lower end 48b may be greater than the slope of the upper end 48a.

The operation of this embodiment is in at least one respect is similar to the operation of the previous embodiments, with at least one difference being that the rib 48 affects the removal force, which provides the hindrance portion 29 over the engagement portion 28 and/or 34, to be higher than in the absence of such element.

Figure 12:
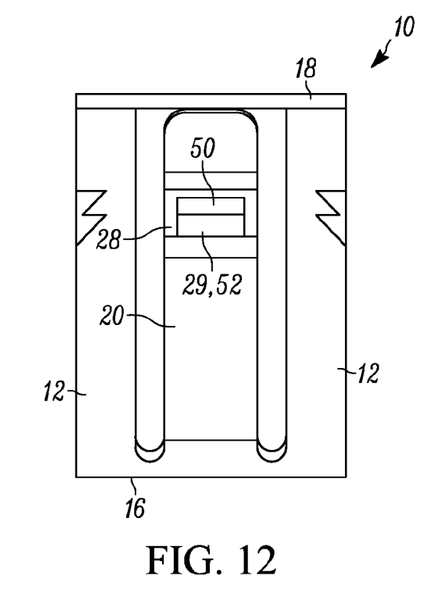
FIG. 12 illustrates a front view of a fastener according to still another embodiment of the instant invention, which fastener comprises an opening with an upward solid bent extension in the engagement region, which provides a hindrance portion.
Figure 12A:
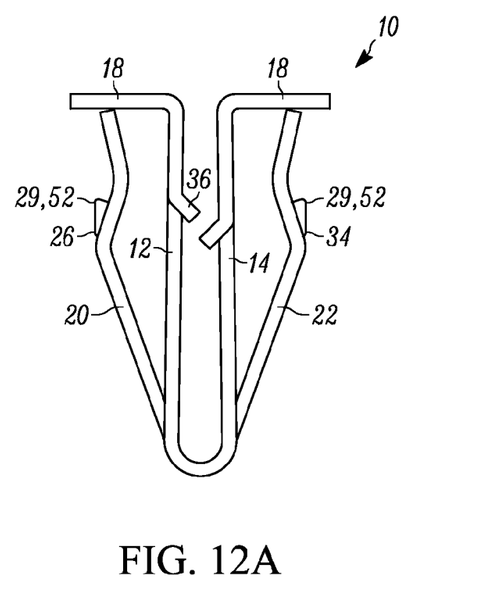
FIG. 12A illustrates a side view of the fastener of FIG. 12.

In another embodiment, better shown in FIGS. 12 and 12A, there is an opening 50 within the engagement portion 28 and/or 34, accompanied by an upward solid bent 52, which bent 52 acts as a hindrance portion 29. The hindrance portion 29, which in this case is the upward solid bent 52, over the engagement portion 28 and/or 34, increases the removal force of the fastener 10 from the respective slot 43 (see FIGS. 3-7).

The operation of this embodiment is substantially the same as the operation of the previous embodiments, with the difference that the removal force is caused by the upward solid bent 52, over the engagement portion 28 and/or 34, to be higher than in the absence of such element.

Figure 13:
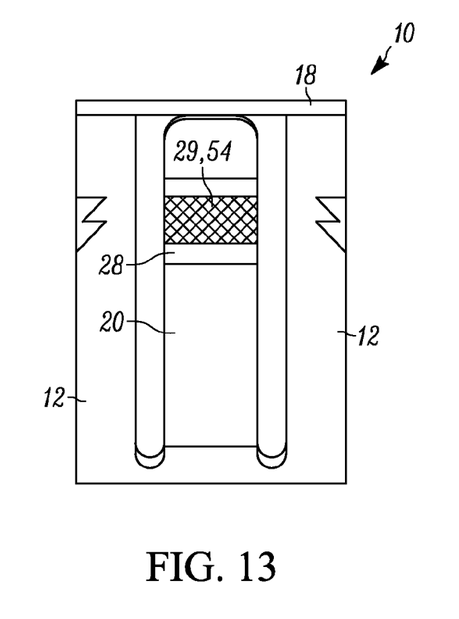
FIG. 13 illustrates a front view of a fastener according to still another embodiment of the instant invention, which fastener comprises a knurled region as the hindrance portion.
Figure 13A:
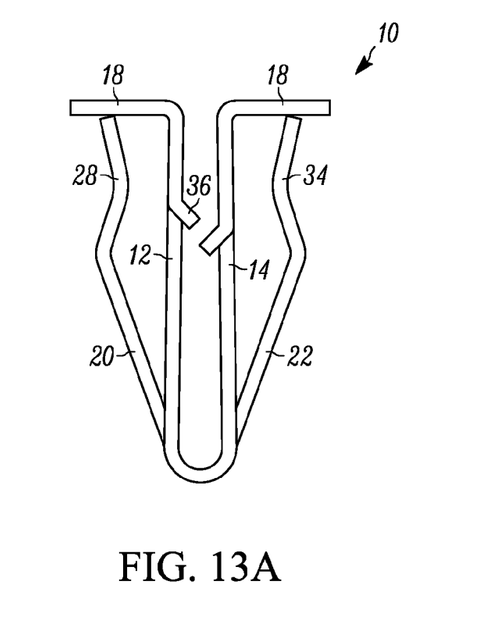
FIG. 13A illustrates a side view of the fastener of FIG. 13.

In still another embodiment, better shown in FIGS. 13 and 13A, the hindrance portion 29 is a knurled region 54. The hindrance portion 29, which in this case is the knurled region 54, increases the removal force of the fastener 10 from the respective slot 43 (see FIGS. 3-7).

The operation of this embodiment is substantially the same as the operation of the previous embodiments, with the difference that the removal force is caused by the knurled region 54 to be higher than in the absence of such element.

Figure 14:
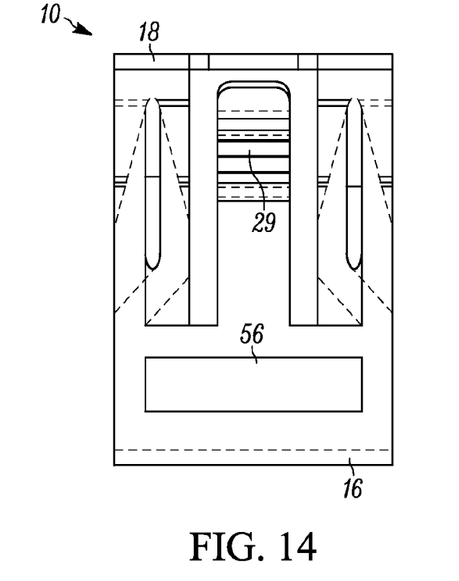
FIG. 14 illustrates a front view of a fastener according to still another embodiment of the instant invention, which fastener comprises a relief opening which helps easier insertion of the fastener into a respective slot.
Figure 14A:
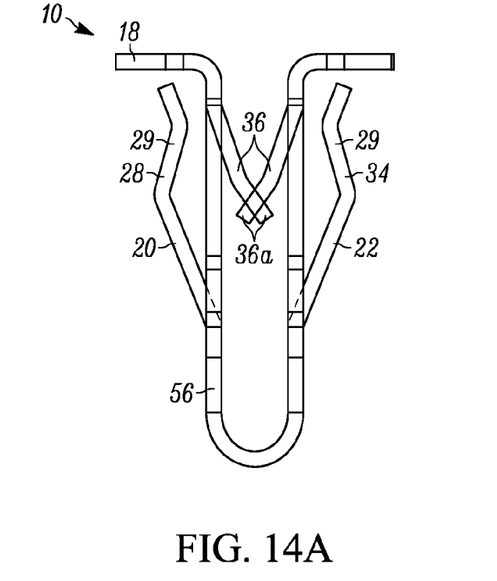
FIG. 14A illustrates a side view of the fastener of FIG. 14.

In another embodiment, better shown in FIGS. 14 and 14A, there is a relief opening 56 in the vicinity the bottom portion 16 of the fastener 10, which relief opening 56 facilitates the springiness of the engagement springs 20 and 22, resulting in easier insertion of the fastener into a respective slot 43 (see FIGS. 3-7), thereby increasing the removal to insertion ratio.

The operation of this embodiment is substantially the same as the operation of the previous embodiments, with the difference that the insertion force is caused by the relief opening 56 to be lower than in the absence of such element.

Figure 15:
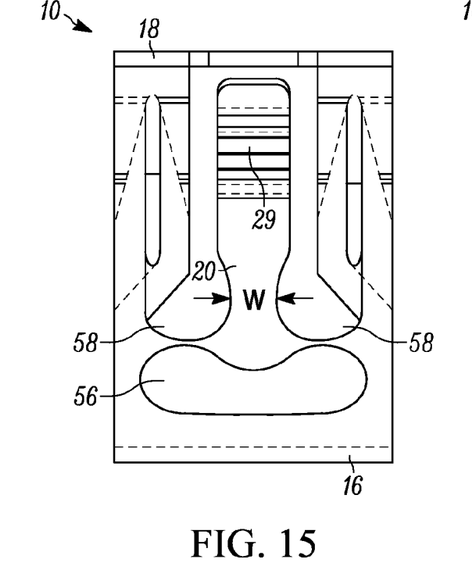
FIG. 15 illustrates a front view of a fastener according to still another embodiment of the instant invention, which fastener comprises a relief opening and undercuts, which help even easier insertion of the fastener into a respective slot.
Figure 15A:
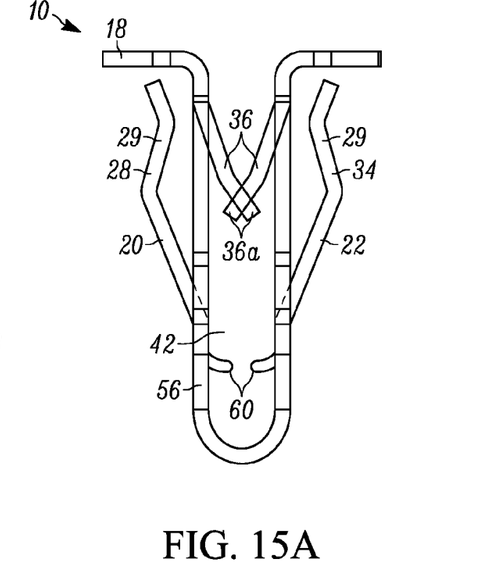
FIG. 15A illustrates a side view of the fastener of FIG. 15, and also illustrates the presence of lower barbs.

In another embodiment, better shown in FIGS. 15 and 15A, there is also a relief opening 56 and undercuts 58 in the vicinity the bottom portion 16 of the fastener 10, which increase even further the springiness of the engagement springs 20 and 22, as compared to the case illustrated in FIGS. 14 and 14A due to the close proximity of the opening 56 to the undercuts 58, and the decreased width W of the engagement springs 20 and 22 by the undercuts 58.

The operation of this embodiment is substantially the same as the operation of the previous embodiments, with the difference that the insertion force is caused by the relief opening 56 and the undercuts 58 to be lower than in the absence of such elements.

It is important to note, as better shown in FIG. 15A that presence of lower barbs 60 causes improved alignment of the extension 38 (FIG. 3) into the cavity 42 of the fastener 10, especially in the case that the thickness of the extension 38 is smaller than the distance between the first side 12 and the second side 14 of the fastener 10.

Figure 16:
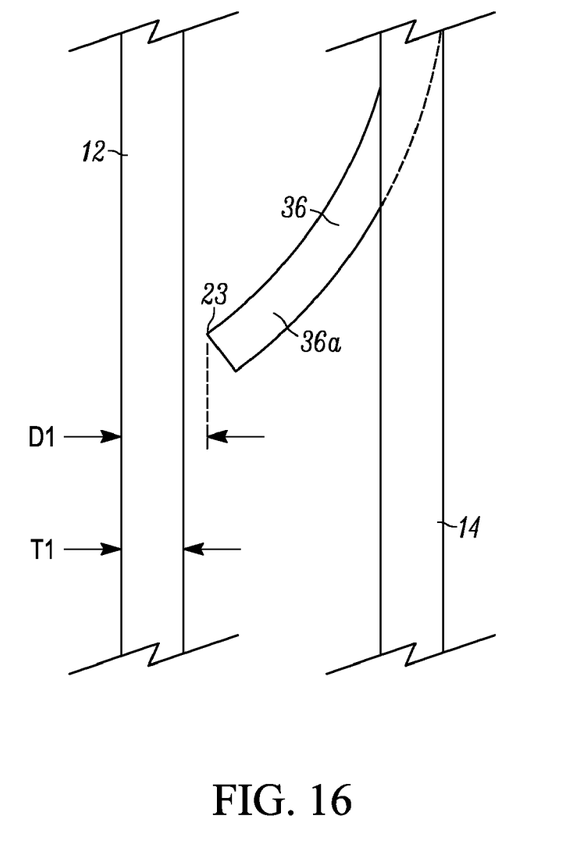

It is further important to note, as shown in FIG. 16, that most preferably, the distance D1 between the front point 23 of the barb 36, which barb 36 originates from the second side 14, and the first side 12 is smaller than the thickness T1 of the material (usually sheet of metal) from which the fastener is made from. The same is true for any other barb, especially for barbs which are closest to the edges of the fastener. Such an arrangement prevents tangling of the fasteners when packaged, especially in bulk.

Barbs with inwardly bent front ends 36a as illustrated in FIGS. 14A, 15A and 16 may be made.

Automobiles or other vehicles may be made, comprising one or more of the fasteners, providing substantial improvements regarding safety, performance and comfort.

Examples of embodiments demonstrating the operation, have now been given for illustration purposes only, and should not be construed as restricting the scope or limits of this invention in any way.

What is claimed is:

1. A fastener comprising:
   a first side;
   a second side opposite the first side, the first side connected to the second side thereby forming a U-shaped structure;
   a bottom portion wherein the first side and the second side are connected;
   a first engagement spring connected to the first side in the vicinity of the bottom portion, the first engagement spring comprising a first elongated rib; and
   a second engagement spring connected to the second side in the vicinity of the bottom portion, the second engagement spring comprising a second elongated rib.

2. The fastener of claim 1, wherein the first and second elongated ribs each comprise an upper end and a lower end, the upper end having a slope that is different from a slope of the lower end.

3. The fastener of claim 2, wherein the slope of the upper end is larger than the slope of the lower end.

4. The fastener of claim 1, wherein the first and second elongated ribs have a substantially rectangular shape.

5. The fastener of claim 1, wherein the first and second elongated ribs have at least one of: a substantially trapezoidal, square, triangular, diamond, and oval shape.

6. The fastener of claim 1, wherein at least one of: the first elongated rib protrudes away from the second engagement spring and the second elongated rib protrudes away from the first engagement spring.

7. The fastener of claim 1, wherein the first and second elongated ribs each form at least a portion of an engagement region.

8. The fastener of claim 1, wherein at least one of: the first side and the second side, comprises at least one barb.

9. The fastener of claim 8, wherein the at least one barb comprises a bent front end.

10. The fastener of claim 1, wherein at least one of: the first engagement spring comprises at least one bend, the second engagement spring comprises at least one bend, the first elongated rib comprises at least one bend, and the second elongated rib comprises at least one bend.

11. The fastener of claim 1, wherein an extraction force is greater than an insertion force.

12. The fastener of claim 1, wherein at least one of: the first engagement spring has a width greater than a width of the first elongated rib and the second engagement spring has a width greater than a width of the second elongated rib.

13. An assembly comprising:
   a panel;
   a fastener operatively coupled to the panel comprising:
      a first side;
      a second side opposite the first side, the first side connected to the second side thereby forming a U-shaped structure;
      a bottom portion wherein the first side and the second side are connected;
      a first engagement spring connected to the first side in the vicinity of the bottom portion, the first engagement spring comprising a first elongated rib; and
      a second engagement spring connected to the second side in the vicinity of the bottom portion, the second engagement spring comprising a second elongated rib.

14. The assembly of claim 13, wherein the first and second elongated ribs each comprise an upper end and a lower end, the upper end having a slope that is different from a slope of the lower end.

15. The assembly of claim 13, wherein the first and second elongated ribs have a substantially rectangular shape.

16. The assembly of claim 13, wherein the first and second elongated ribs have a substantially rectangular shape.

17. The assembly of claim 13, wherein at least one of: the first side and the second side, comprises at least one barb.

18. The assembly of claim 13, wherein at least one of: the first engagement spring comprises at least one bend, the second engagement spring comprises at least one bend, the first elongated rib comprises at least one bend, and the second elongated rib comprises at least one bend.

19. A vehicle comprising:
   a vehicle chassis;
   a fastener operatively coupled to the vehicle chassis comprising:
      a first side;
      a second side opposite the first side, the first side connected to the second side thereby forming a U-shaped structure;
      a bottom portion wherein the first side and the second side are connected;
      a first engagement spring connected to the first side in the vicinity of the bottom portion, the first engagement spring comprising a first elongated rib; and
      a second engagement spring connected to the second side in the vicinity of the bottom portion, the second engagement spring comprising a second elongated rib.

20. The vehicle of claim 19, wherein the first and second elongated ribs each comprise an upper end and a lower end, the upper end having a slope that is different from a slope of the lower end.

21. The vehicle of claim 20, wherein the slope of the upper end is larger than the slope of the lower end.

22. The vehicle of claim 19, wherein the first and second elongated ribs have a substantially rectangular shape.

23. The vehicle of claim 19, wherein the first elongated rib protrudes away from the second engagement spring and the second elongated rib protrudes away from the first engagement spring.

24. The vehicle of claim 19, wherein at least one of: the first side and the second side, comprises at least one barb.

25. The vehicle of claim 19, wherein at least one of: the first engagement spring comprises at least one bend, the second engagement spring comprises at least one bend, the first elongated rib comprises at least one bend, and the second elongated rib comprises at least one bend.

26. The fastener of claim 1, wherein the first elongated rib is formed on a bend on the first engagement spring and the second elongated rib is formed on a bend on the second engagement spring.

* * * * *